Figure 2:
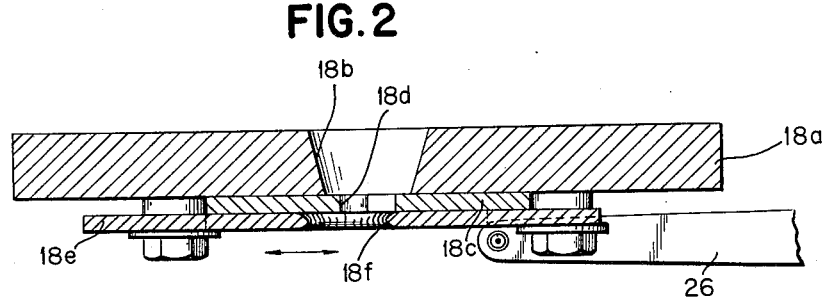

Nov. 2, 1965
C. G. OLDERSHAW ETAL
3,215,094
EXTRUSION APPARATUS AND PROCESS
Filed July 13, 1964
3 Sheets-Sheet 1
FIG. 1
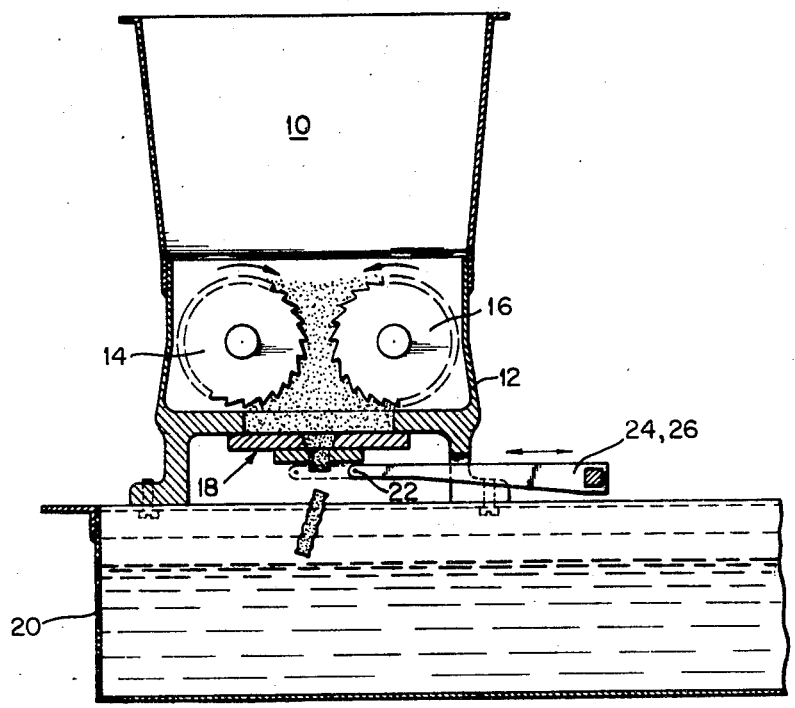
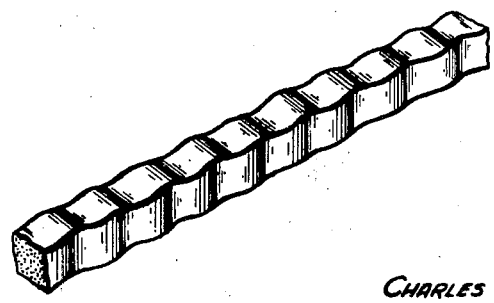
FIG. 6
INVENTORS
CHARLES G. OLDERSHAW
AND
JOHN A. FRANE
BY *Frederick F. Mash*
*Michael J. Quillinan*
ATTORNEYS Nov. 2, 1965  C. G. OLDERSHAW ETAL  3,215,094
EXTRUSION APPARATUS AND PROCESS
Filed July 13, 1964  3 Sheets-Sheet 2

INVENTORS
CHARLES G. OLDERSHAW
AND
JOHN A. FRANE

BY Frederick F. Mack &
Michael J. Quillinan
ATTORNEYS

INVENTORS
CHARLES G. OLDERSHAW
AND
JOHN A. FRANE

BY Frederick F. Mack &
Michael J. Quinn
ATTORNEYS.

United States Patent Office 3,215,094
Patented Nov. 2, 1965

3,215,094
EXTRUSION APPARATUS AND PROCESS
Charles G. Oldershaw, Avon, and John A. Frane, Ardsley, N.Y., assignors to General Foods Corporation, White Plains, N.Y., a corporation of Delaware
Filed July 13, 1964, Ser. No. 383,547
9 Claims. (Cl. 107—54)

The present application is a continuation-in-part of U.S. patent application Serial No. 136,243, filed September 6, 1961, for "Food Product and Process," now abandoned.

This invention relates to a novel method and apparatus for providing corrugated surfaces on an extruded mass of food solids and the product formed thereby. More particularly, it is concerned with an apparatus and method for continuously extruding corrugated vegetable sticks suitable for deep fat frying.

Comestibles are presently marketed which have crinkled or corrugated surfaces. The most common example is "crinkle-cut" French fried potatoes for distribution in the frozen state. These potato products are produced by peeling, trimming and cutting whole raw potatoes into slices of suitable size, the cuting means having edges located to provide a crinkled surface on the sides of the slices or strip; the slices are eventually fried and marketed in the frozen state. Such potato products have enjoyed considerable commercial success; the consumer has the option of either reheating a pre-fried piece or refrying the frozen piece to heighten the characteristic fried golden color and flavor of the potato product.

The manufacture of these French fried potato products, however, is wasteful of raw material, as the skin or peel portion of the potato is not usable in other food applications, and raw potatoes of a particular grade or size must be employed in order that the potato slice or strip be of the size and color normally associated with French fried potatoes. Thus, small potatoes are culled even though they might be otherwise usable. A process is desired, therefore, which increases utilization of potatoes of various grades or sizes. It would be a distinct improvement in the art if this process also provided a pre-fried slice or stick having novel surfaces thereon such as are afforded by corrugated knives or other cutting implements used to make so-called "crinkle-cut" products from whole potatoes.

Although the present invention will be exemplarily described with reference to the preparation of a pre-fried corrugated potato piece, the process and apparatus may also be utilized for preparation of other forms of cooked and deep fat fried vegetables, fruits and like starchy or saccharide-containing produce which can be endowed with an attractive flavor and appearance through frying.

In general, the apparatus and process of the present invention relate to the extrusion of a mass of food solids through an opening in a die member to form a cohesive elongated body of those solids. The body produced by the practice of the present process and by the use of the present apparatus is one in which corrugations are produced on at least one pair of opposed longitudinally extending surfaces of the edible product formed. This food product, which may have the general form of a French fried potato, has two pairs of opposed surfaces which adjoin each other at their edges and is in the general shape of a hexahedron.

The elongated body produced on extrusion is, coincident with such extrusion, provided with corrugations in at least one of its pairs of opposed longitudinally extending surfaces. Since the extrusion of the elongated body is continuous, it is necessary to pass severing means at a predetermined rate through the elongated body formed on extrusion. When the elongated body is extruded at another predetermined rate, the severing means will cut the elongated body into a multiplicity of corrugated sticks. According to one feature of the present invention, the extruded body can be reciprocated to form corrugations on both pairs of the opposed surfaces; in another form of invention only one pair of opposed surfaces is corrugated during extrusion, the other surfaces being corrugated by the severing means, which may take the form of a wire bent to form alternating crests and troughs in an undulating manner.

In accordance with one embodiment of the process and apparatus of the present invention, a starch-containing vegetable (typically potato) is peeled of undesirable skin portions, cooked and mashed or otherwise comminuted to an extrudable plastic consistency. This mash is then caused to pass through a die member having one or more openings therein with angularly related forming sides capable of shaping an extrudate so that it has two or more angularly related surfaces in cross-section. As the extrudate issues from this die member a second forming element or die member contacts the extrudate through movement in a direction substantially normal to the path of travel of the extrudate so as to impress in a consecutive manner on other surface portions thereof further angularly related surfaces. As will be more fully described hereinafter, this latter moving element is reciprocated either to impress upon the extrudate the desired corrugated surface or to cut across the path of travel of the extrudate completely.

It is a feature of the present invention that the mash of comminuted food solids is conditioned preparatory to extrusion by (a) chilling the mass to a temperature at which it will retain its shape after formation of corrugated surfaces on the formed piece and during subsequent deep fat frying thereof; and (b) incorporating a cellulose gum, typically a cellulose methyl ether or any other such colloid which will gel on heating, allowing a skin or containing layer to be formed on the outside of the shaped corrugated piece during the course of frying such that departure of the piece from its intended shape does not occur during frying. Cooling the corrugated extrudate preserves the intact condition of the extrudate during the early stages of frying until the cellulosic colloid has been elevated sufficiently in temperature to serve its skin-forming function. This consideration is important where a corrugated surface is provided on the mash of food solids extrudate, since the structural weakness of the mass at its narrow cross-sections can contribute to fracture of an intended length of the piece. Further, by cooling the mash and providing the cellulosic colloid therein any unusual surface form will be more satisfactorily preserved so that the shaped mash or extrudate will retain substantially all of its preformed surface dimension, outline and overall appearance.

Although potatoes are the most popular form of French fried articles, other comminuted vegetable solids (as indicated previously) may be used, typical among which are finely or coarsely chopped or shredded celery, cabbage, broccoli, parsley, garlic, onion, carrots, corn kernels, spinach, peppers and the like. The comminution of these vegetables will depend upon their contribution to the overall texture of the deep-fat fried piece in combination with other comminuted vegetables. Thus, celery, parsley, garlic and onion are preferably finely chopped, whereas cabbage and broccoli may be coarsely chopped and carrots shredded. To provide a suitable mash consistency, these vegetables are blended at an appropriate level whereby the desired surface is provided on the corrugated extrudate. Wheat, rice or potato flour, corn starch and other thickening farinaceous materials, such as tapioca, sago and other starches, may be added to the mash intended for shaping. In all of these applications it has been found that chilling of these comminuted food solids to a temperature above the freezing point of water therein and to a temperature substantially below 70° F. is important in order that the mash thereof will survive the forming operations to which the mash is subjected incident to extrusion, forming and cutting. The cellulosic gum is compatible with all of such solids and makes its major contribution to preservation of the corrugated crinkled surface on the shape piece during the frying thereof.

Figure 3:
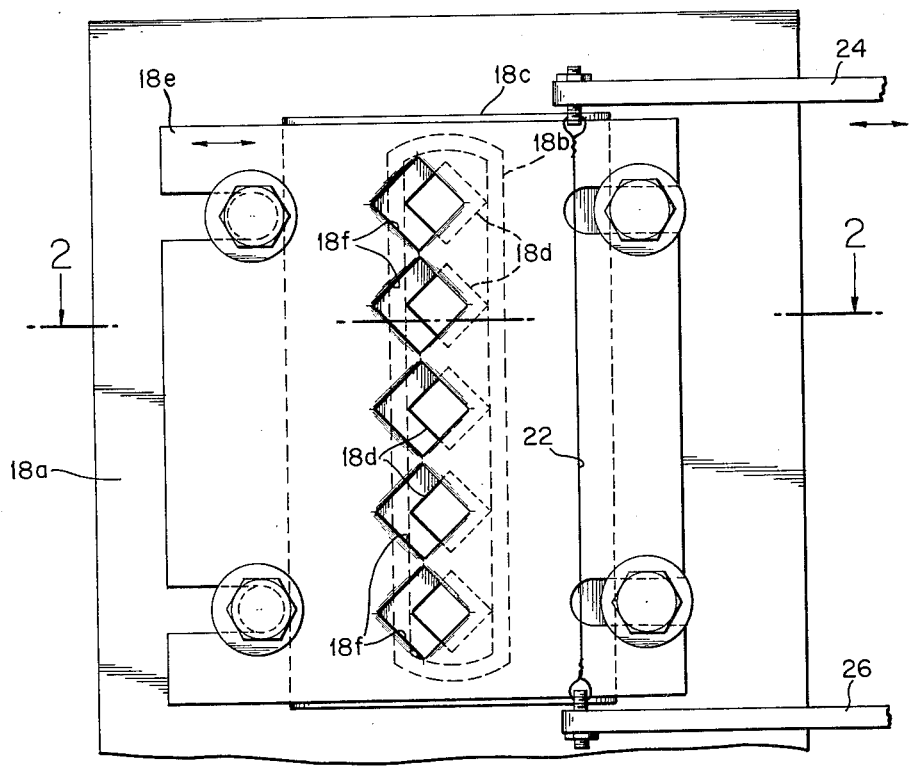
Figure 4:
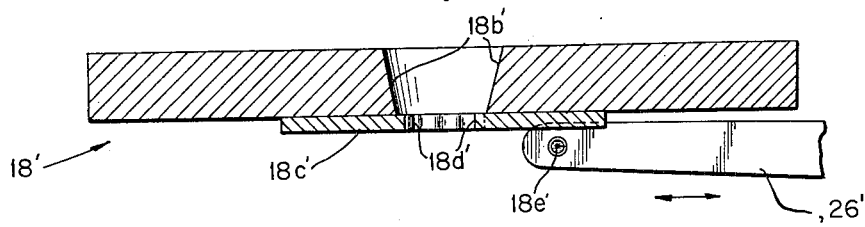
Figure 5:
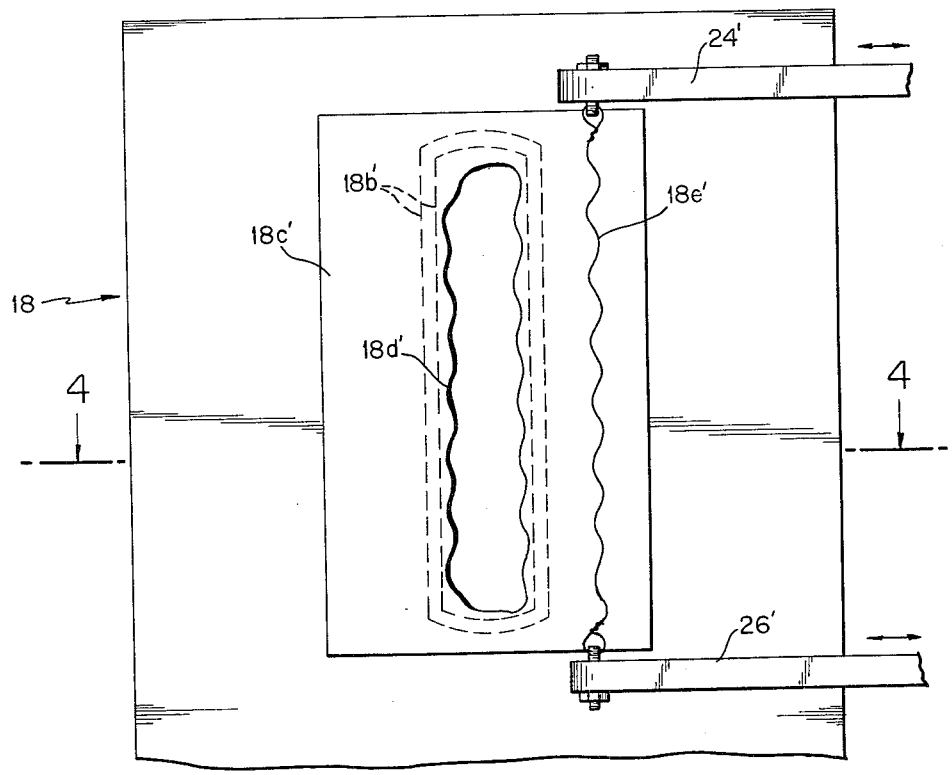

The invention will now be more fully understood by reference to the accompanying schematic drawing showing two preferred embodiments of the process for forming the crinkled surface on the mash during extrusion. FIGURE 1 is an elevation in section of means for extruding the chilled mash through a suitable die forming and shaping member. FIGURE 2 is an enlarged sectional view of the die forming and shaping member in FIGURE 1; and FIGURE 3 is a bottom plan view of the elements in FIGURE 2 looking axially along the direction of extrusion. FIGURE 4 is a side elevation in section of another means for shaping the vegetable mash and thereafter cutting the surface of the extrudate; and FIGURE 5 is a bottom plan view of the apparatus in FIGURE 4. FIGURE 6 is a perspective view of the "crinkled" French fried vegetable piece.

Referring now to FIGURES 1 and 3, the invention will be described in accordance with a preferred method of forming a mash of potato solids for producing a French fried potato stick having a crinkled surface like that in FIGURE 6.

Maine potatoes are abrasion peeled, trimmed, washed and diced to ½" cubes. The diced cubes are water blanched and then deposited on a traveling belt which transports the potatoes into and through a cooling tunnel through which is recirculated cool dry air at a temperature of 20° F. whereby the potatoes are chilled to a temperature of about 40° F. The chilled potato cubes are then mashed in a mixer to provide a lumpy consistency. During this mashing operation, approximately 0.5% methyl cellulose (8000 cps, viscosity) by weight of the total mash is added in a powdered form so as to uniformly distribute the methyl cellulose throughout the mash. The mash is then fed to a Hobart mixer in which it is further subdivided by discharge from the orifices at the end of the extrusion chamber thereof to produce filaments approximately ⅛" in diameter. These filaments at a temperature of approximately 45° F. are fed to hopper 10 of the die forming and cutting machine seen in FIGURE 1.

This machine comprises hopper 10 located atop housing 12 in which are mounted oppositely driven ribbed feed rolls 14 and 16 spaced sufficiently apart to deliver the mash to die member generally indicated at 18 and adapted to issue an extrude therethrough for deposit into a deep fat fryer shown generally at 20 after having been cut into pieces by wire 22 extended between reciprocating fingers 24 and 26 adapted to be moved across the vertical axis of die member 18.

Referring now to FIGURES 2 and 3, it will be seen that die member 18 comprises a base plate 18a having an elongated slot 18b whose narrowing side faces neck in and communicate with die member 18c fixed to base plate 18a and have a plurality of square openings 18d therein adapted to permit issuance of the mash therethrough and form extrudates of square cross-section. Located below die member 18c is striker plate 18e having square openings 18f, the outlines of which are preferably larger than the outlines of openings 18d in die member 18c. The openings in 18e are adapted to shift in a direction normal to the extrusion axes of the die member openings and reciprocate with an amplitude such that edges of openings 18f move back and forth across openings 18d to partially obstruct the opening as shown in FIGURE 3. Striker plate 18e is in contact with die member 18c in a manner such that it can slide relative thereto without excessive friction.

As the potato mash is extruded through the die member 18, the inner free edges of opening 18f impart a crinkled surface to the square surface of the extrudate formed by die member 18c through the deformation of the extrudate as it passes through the reciprocating striker plate 18e. The "pitch" of the corrugations will depend upon the frequency with which the striker plate 18e is reciprocated and the rate at which mash is extruded through the die 18. The height of the corrugations with respect to the piece extruded will depend upon the amplitude of the motion of the striker plate and the relation of the openings 18f and 18d one to another. For purposes of the present invention it is preferred that the inner free edges of opening 18f at striker plate 18e be brought to a rounded point so as to promote an even formation of the crinkled surface produced on the formed potato as the extrudate passes through the die 18c and is deformed by the motion of striker plate 18e. Also this inner free edge of opening 18f preferably should not pass the midpoint or axis of opening member 18d in die member 18c in order to assure that the crinkle piece formed will have sufficient cross-sectional area to retain its intended shape or form.

Means are provided for reciprocating the striker plate 18e in the directions of the arrows in FIGS. 2 and 3. The reciprocating means is conventional and, consequently, is not illustrated in detail. However, it may be a power take-off from the drive that operates feed rolls 14 and 16 in housing 12, or, for example, a separately powered device for oscillating striker plate 18e such as will be well-known to those skilled in the art. In one position of oscillation openings 18f in striker plate 18e are aligned with their corresponding openings 18d in base plate 18a. Upon reciprocation, openings 18f are moved out of axial alignment with their corresponding openings 18d on either side of the latter openings, thus imparting corrugated surfaces to all four longitudinally extending surfaces of the body extruded through openings 18d.

After the corrugations have been induced on all four sides of the extrudate, straight wire 22 is caused to move quickly across the axis of die assembly 18 to intersect and cut the extrudate thereby forming a piece of the desired length which drops directly into the deep fat fryer 20, the length of the piece being dependent upon the frequency of travel of the wire 22 and the rate at which the extrudate is produced.

In lieu of the modification shown in FIGS. 1 to 3, an extruding implement like that shown in FIGS. 4 and 5 may be employed. In that apparatus the mash is fed to a hopper having a similar pair of ribbed driving rolls mounted for opposite rotation in a housing and also having a die assembly 18' which has an elongated slot 18b' communicating with die member 18c' having an elongated slot 18d' the sides of which are corrugated to form a corrugated surface on two sides of the mash extrudate passing through die member 18c'. In lieu of striker plate 18e of the first embodiment, a helical spring 18e' is stretched between fingers 24' and 26' which are caused to travel rapidly across the opening 18d' in die member 18c' and in so doing cut corrugations on the two other major surfaces of the extrudate thereby also producing a crinkled cut piece of the type shown in FIG. 5. The frequency of travel of spring 18e' will be substantially higher than the frequency of travel of wire 22 in the first embodiment. The amplitude and pitch of the corrugations produced in the extrudate as seen in FIG. 5 will depend upon the amplitude and pitch of the coil wire 18e' stretching between arms 24' and 26' and preferably should match the amplitude and pitch of corrugations formed by the opening 18d' in die member 18c'.

The corrugated extrudate is then French fried in a deep fat fryer 20 containing a vegetable shortening such as cottonseed oil at a temperature of 375° F. The crinkled stick will usually be left in the fryer for a period of between 40 to 120 seconds until the piece has turned golden brown, whereafter the piece will be withdrawn and preferably frozen in a tunnel freezer for distribution. The edible stick illustrated in FIG. 6 has all four elongated sides thereof corrugated. Each pair of opposed sides is corrugated, although the crests of the corrugations of one pair of opposed surfaces are aligned with the troughs of the other pair of opposed surfaces.

In the foregoing operation a potato mash being shaped should preferably have a solids content between 17 to 23% and in cases where the cooked potato mash does not have this solids content, additional solids should be added to the mash either in the form of dehydrated potato flakes, granules, shred or other forms of dehydrated mashed potatoes. Broadly, however the solids content of the mash will usually range between 15 to 35%. The cellulose gum or colloid added to the mash should be present in such a condition as to be adsorbed on the vegetable solids and the condition of the mash should be such that there is essentially no free water such that the water of hydration is substantially imbibed by the starch cells or starchy thickener mixed therewith. The cellulose gum may be added to the comminuted potato solids or other vegetable solids as in the foregoing example but in the form of a concentrated solution instead of a powder or at any point in the operation assuring that the potatoes or other vegetable solids will have the colloid suitably distributed throughout so as to gel on heating and allow a skin to be formed on the outside of the shape while it is being fried. Preferably the colloid is added in the form of a powder while the vegetable solids such as the potatoes are being mashed preparatory to introduction to the die assembly.

The level of colloid used will vary to some extent depending upon its viscosity. The higher the viscosity employed the lower the level required; the heavier the consistency of the mash the lower the level of colloid necessary. In general, however, the level of colloid should be added to an extent sufficient to provide on the shaped vegetable a surface film which will effectively retard fat up-take during frying so that an excess of the desired level of fat in the final product will be avoided while at the same time offering the desired production of the shaped piece against disintegration during frying.

The term "cellulose gum" as used herein designated not only the non-ionic but also the ionic cellulose derivatives which are non-toxic. Among the cellulose gums which are suitable for use can be listed methyl cellulose, methyl ethyl cellulose, hydroxymethyl cellulose, methylhydroxyethyl cellulose, cellulose sulfate like sodium cellulose sulfate and glycolic acid salts, like sodium potassium and ammonium carboxymethyl cellulose. In general the non-ionic cellulose ethers are preferred. The level of cellulose gum to be employed will be a very minor part by weight of the potato as typified by the range of 0.1 to 3.5% methyl cellulose having a viscosity of 1000 to 15,000 cps.

In lieu of the potato mash described hereinabove a vegetable stick may be produced in the apparatus depicted and containing the following ingredients:

| Ingredients: | Formulation amount, gms. |
|---|---|
| Celery—finely chopped, blanched in 2 cups water 3 minutes | 170 |
| Cabbage—coarsely chopped | 150 |
| Broccoli—coarsely chopped | 145 |
| Parsley—finely chopped | 15 |
| Garlic—finely chopped | 2.5 |
| Onion—finely chopped | 40 |
| Carrots—shredded | 2.5 |
| Corn kernels | 325 |
| Flour—all purpose wheat | 60 |
| Water—cold | 180 |
| M.S.G. | 5 |
| Salt | 5 |
| Soy sauce | 30 |
| Methyl cellulose (5000 cps.) powder | 12.5 |

These vegetables were united into a corrugated stick form using the following procedure: the broccoli and carrots were sauteed in 70 gms. of butter; the celery, cabbage, garlic, onion and parsley were sauteed in another 70 gms. of butter; in each case sauteeing was continued until 25% of the weight is lost in both portions. The sauteed ingredients were then combined and the corn was added; then the flour and methyl cellulose powder were added and mixed. The water and the other ingredients listed were added and the mash thus produced upon mixing was chilled in the tunnel chiller described above to a temperature of 40° F. This mash was then fed to the cutting means described in FIG. 1 and the crinkled piece produced deposited in the deep fat fryer and fried at 400° F. for 30 minutes. The formed crinkled surface vegetable stick was fried in cottonseed oil at 375° F. for 70 seconds; the fried sticks were then cooled, packed in cartons and frozen in a plate freezer for distribution.

While the present invention has been described with particular reference to specific examples, it is not to be limited thereby, but reference is to be had to the appended claims for a definition of its scope.

What is claimed is:

1. A process for shaping a mass of food solids to form an edible corrugated stick of said solids, comprising extruding at a predetermined rate from a die member defining an opening therein a cohesive elongated body of said solids, said body having a pair of opposed longitudinally extending surfaces adjoining at their edges a further pair of opposed longitudinally extending surfaces, said opening being in the shape of a cross section of said body normal to both of said pairs of surfaces, reciprocatingly deforming said extruded body as it is being extruded to form corrugations in at least one of said pairs of opposed surfaces, and then passing severing means through said elongated body at a predetermined rate to form individual corrugated sticks.

2. A process as claimed in claim 1, in which said opening is in the substantial shape of a square.

3. A process for shaping a mass of food solids to form an edible corrugated stick of said solids, comprising extruding at a predetermined rate from a die member defining an opening therein a cohesive elongated body of said solids, said body having a pair of opposed longitudinally extending sufraces adjoining at their edges a further pair of opposed longitudinally extending surfaces, said opening being in the shape of a cross section of said body normal to both of said pairs of surfaces, reciprocatingly deforming said extruded body as it is being extruded by passing it through an opening in a second die member as said second die member is being reciprocated, to form corrugations in both of said pairs of opposed surfaces, and then passing severing means through said elongated body at a predetermined rate to form individual corrugated sticks.

4. A process for shaping a mass of food solids to form an edible corrugated stick of said solids, comprising extruding at a predetermined rate from a die member defining an opening therein a cohesive elongated body of said solids, said body having a pair of opposed longitudinally extending surfaces adjoining at their edges a further pair of opposed longitudinally extending surfaces, said opening being in the shape of a longitudinal cross section of said body normal to one of said pairs of surfaces and parallel to the other of said pairs, coincident with said extruding forming corrugations in one of said pairs of opposed surfaces, and then passing severing means having an undulating outline through said elongated body at a predetermined rate to form corrugations in the other of said pairs of opposed surfaces and concomitantly dividing said body into a multiplicity of individual corrugated sticks.

5. Apparatus for shaping a mass of food solids to form an edible stick having a pair of opposed longitudinally extending surfaces adjoining at their edges a further pair of opposed longitudinally extending surfaces, comprising a first die member defining a first opening therein through which said mass of solids is forced to issue therefrom at a predetermined rate, a second die member defining a second opening therein, said second die member being located outwardly of and adjacent to said first die member so that in one position thereof said second opening is in substantial axial alignment with said first opening, means for moving said second die member out of and into said position immediately subsequent to extrusion of said mass through said first die member to form an elongated continuous body of food solids having opposed corrugated surfaces, and means passing through said continuously extruded body at a predetermined rate to divide said body into individual corrugated sticks.

6. Apparatus for shaping a mass of food solids to form an edible stick having a pair of opposed longitudinally extending surfaces adjoining at their edges a further pair of opposed longitudinally extending surfaces, comprising a first die member defining a first substantially square opening therein through which said mass of solids is forced to issue therefrom at a predetermined rate, a second die member defining a second substantially square opening therein, said second die member being located outwardly of and adjacent to said first die member so that in one position thereof said second opening is in substantially axial alignment with said first opening, means for moving said second die member out of and into said position immediately subsequent to extrusion of said mass through said first die member to form an elongated continuous body of food solids having opposed corrugated surfaces, and means passing through said continuously extruded body at a predetermined rate to divide said body into individual corrugated sticks.

7. Apparatus as claimed in claim 6, in which said second opening is slightly larger than said first opening.

8. Apparatus as claimed in claim 6, in which said second square opening is rounded at the corners of its square.

9. Apparatus for shaping a mass of food solids to form an edible stick having a pair of opposed longitudinally extending surfaces adjoining at their edges a further pair of opposed longitudinally extending surfaces, comprising a first die member defining a first opening therein through which said mass of solids is forced to issue therefrom at a predetermined rate, a second die member defining a second opening therein, said second die member being located in slidable contact with said first die member so that in one position thereof said second opening is in substantial axial alignment with said first opening, and forms a continuation thereof, means for reciprocating said second die member between locations equally spaced from said position coincident with the extrusion of said mass through said first die member to form an elongated continuous body of food solids having opposed corrugated surfaces, and means passing through said continuously extruded body at a predetermined rate to divide said body into individual corrugated sticks.

References Cited by the Examiner
UNITED STATES PATENTS

| 2,088,298 | 7/37 | Love | 99—100 |
| 3,010,497 | 11/61 | Pease | 146—78 |
| 3,085,020 | 4/63 | Backinger et al. | 99—207 |

FOREIGN PATENTS

| 368,148 | 5/19 | Germany. |

A. LOUIS MONACELL, *Primary Examiner.*